(12) United States Patent
Hirai et al.

(10) Patent No.: US 6,411,198 B1
(45) Date of Patent: Jun. 25, 2002

(54) PORTABLE TERMINAL DEVICE

(75) Inventors: Koutarou Hirai, Kanagawa (JP);
Masayuki Yanagida, Atlanta, GA (US);
Ai Takasu, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/226,731

(22) Filed: Jan. 7, 1999

(30) Foreign Application Priority Data

Jan. 8, 1998 (JP) .......................................... 10-002685

(51) Int. Cl.⁷ ................................................ G08B 5/22
(52) U.S. Cl. ...................... 340/7.6; 340/7.61; 340/7.55; 340/7.2; 345/102
(58) Field of Search ....................... 340/825.46, 825.44, 340/7.6, 7.2, 7.55, 7.61; 345/102

(56) References Cited

U.S. PATENT DOCUMENTS

| | | | |
|---|---|---|---|
| 4,876,536 A | * 10/1989 | Matai et al. | 340/7.61 |
| 4,975,693 A | * 12/1990 | Davis et al. | 340/7.6 |
| 4,975,694 A | * 12/1990 | McLaughlin et al. | 340/7.6 |
| 5,005,013 A | * 4/1991 | Tsukamoto et al. | 340/7.56 |
| 5,546,078 A | * 8/1996 | Motohashi et al. | 340/7.61 |
| 5,793,304 A | * 8/1998 | Sone | 340/7.56 |
| 5,877,695 A | * 3/1999 | Kubes et al. | 340/815.4 |
| 5,926,239 A | * 7/1999 | Kumar et al. | 349/69 |
| 6,115,023 A | * 9/2000 | Uchida | 345/114 |
| 6,131,046 A | * 10/2000 | Sano et al. | 455/566 |

FOREIGN PATENT DOCUMENTS

| | | |
|---|---|---|
| GB | 2242048 | 9/1991 |
| GB | 2296635 | 7/1996 |
| GB | 2308038 | 6/1997 |
| GB | 2314185 | 12/1997 |

OTHER PUBLICATIONS

WO 96/27974.
WO 91/07041.

* cited by examiner

Primary Examiner—Michael Horabik
Assistant Examiner—Yves Dalencourt
(74) Attorney, Agent, or Firm—Pearne & Gordon LLP

(57) ABSTRACT

A portable terminal device of a calling party individually sets a sounding pattern to be used for reporting an incoming call, and a called party is informed of the thus-set sounding pattern beforehand. As a result, when the terminal device of the called party makes the thus-set sounding pattern, the terminal device enables the user to immediately specify the calling party. In addition to sound, blinks of light, vibration of a vibrator, or the color of backlight can be used solely or in combination two of more. Further, so long as the portable terminal device is provided with display means capable of displaying characters, in addition to the incoming call reporting means, a simple message can be indicated on the portable terminal device. Consequently, the called party can immediately ascertain the nature of the call without directly talking with the calling party through the portable terminal device.

28 Claims, 6 Drawing Sheets

FIG. 2

| NUMBER OF SOUND PATTERN | SOUND PATTERN/MELODY |
|---|---|
| 01 | BEEP 1 |
| 02 | BEEP 2 |
| 03 | BEEP 3 |
| 04 | BEEP 4 |
| 05 | MELODY 1 |
| 06 | MELODY 2 |
| 07 | MELODY 3 |
| 08 | MELODY 4 |
| 09 | MELODY 5 |
| 10 | MELODY 6 |
| 11 | MELODY 7 |
| 12 | MELODY 8 |
| 13 | MELODY 9 |
| 14 | MELODY 10 |
| 15 | MELODY 11 |
| 16 | MELODY 12 |
| 17 | MELODY 13 |
| 18 | ORIGINAL MELODY |

FIG. 5

```
RECEIVED MAIL
                20TH  16:40
" ♪ 14  WHERE ARE YOU NOW?"
                      "DISPLAY"
```

FIG. 6

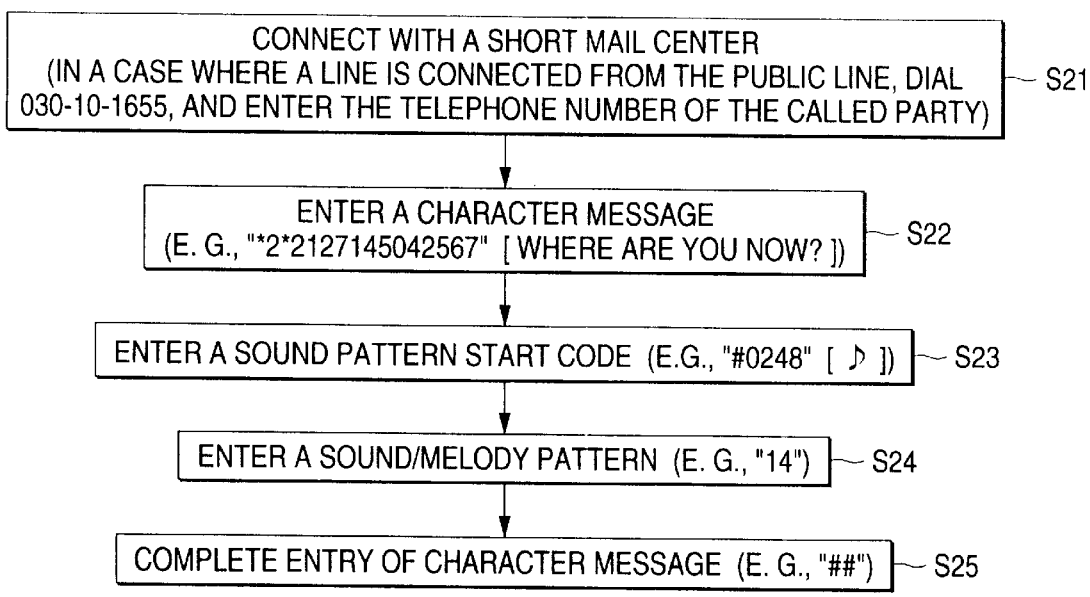

(MELODY "LET IT BE" IS ISSUED FROM SPEAKER)

FIG. 7

CONNECT WITH A SHORT MAIL CENTER
(IN A CASE WHERE A LINE IS CONNECTED FROM THE PUBLIC LINE, DIAL 030-10-1655, AND ENTER THE TELEPHONE NUMBER OF THE CALLED PARTY) — S21

↓

ENTER A CHARACTER MESSAGE
(E. G., "*2*2127145042567" [ WHERE ARE YOU NOW? ]) — S22

↓

ENTER A SOUND PATTERN START CODE (E.G., "#0248" [ ♪ ]) — S23

↓

ENTER A SOUND/MELODY PATTERN (E. G., "14") — S24

↓

COMPLETE ENTRY OF CHARACTER MESSAGE (E. G., "##") — S25

FIG. 8

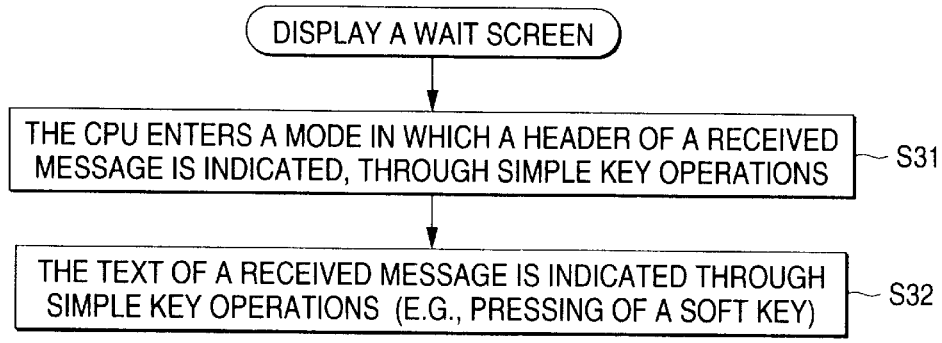

```
RECEIVED MAIL
            20TH  16:40
"WHERE ARE YOU NOW? ♪ 14"
                    "DISPLAY"
```

```
"WHERE ARE YOU NOW? ♪ 14"

"EDITION"
```
(MELODY 14 IS ISSUED FROM SPEAKER)

(MELODY 14 IS ISSUED FROM SPEAKER)

PORTABLE TERMINAL DEVICE

BACKGROUND OF THE INVENTION

The present invention relates to a portable terminal device which enables a user to identify a calling party through use of a sound pattern, a blink pattern, a vibration pattern, or a backlight color, all of which are set by another portable terminal device.

Recent portable terminal devices have shown a distinguished tendency to pursue a higher level of function, such as that represented by a digital portable cellular phone. Even in a case where an incoming call is reported to the user by way of a sounding tone, a plurality of sound patterns for reporting an incoming call are available. The user can set his portable terminal device so that an incoming call can be reported according to selection of his favorite sound pattern from the available sound patterns.

FIG. 13 is a functional block diagram schematically showing the configuration of an incoming call sound section disposed in a conventional portable terminal device of this type. In FIG. 13, reference numeral 21 designates receiving means for receiving a signal wave transmitted from another portable terminal device; 22 designates storage means for storing at least two sound data sets; 23 designates sounding means capable of reporting the arrival of an incoming call by means of at least two sound data sets; and 24 designates control means for controlling the sounding means 23 on the basis of the data sets selected from at least the two sound data sets stored in the storage means 22.

In the portable terminal device having such a configuration, the sounding means 23 is activated according to a sounding pattern set by the user. In the case of a portable terminal device capable of setting two sounding patterns, e.g., setting a beep as a first sound data set and setting a melody as a second sound data set, the user selects either the first sound data set or the second sound data set stored in the storage means 22, by way of the control means 24. When an incoming call is received from another portable terminal device, the receiving means 21 of the portable terminal device recognizes the arrival of the incoming call, and the control means activates the sounding means 23 on the basis of the sound data set selected by the user.

In the conventional portable terminal device, the sounding means can be activated solely according to the sounding pattern set by the user of the terminal device. Although the sounding pattern can be arbitrarily changed, the user cannot ascertain the identity of the calling party before he talks with the calling party by means of the terminal device.

SUMMARY OF THE INVENTION

The present invention has been conceived to solve the problem of the conventional portable terminal device, and the object of the present invention is to provide a portable terminal device which enables the user to immediately identify a calling party by utilization of a sounding pattern issued for reporting the arrival of an incoming call to the user.

To this end, according to the present invention, another portable terminal device individually sets a sounding pattern to be used for reporting an incoming call, and a called party is informed of the thus-set sounding pattern beforehand. As a result, when the terminal device of the called party makes the thus-set sounding pattern, the terminal device enables the user to immediately specify the calling party for the call. In addition to sound, blinking of light, vibration of a vibrator and the color of backlight used for a display may be utilized for reporting an incoming call. So long as a plurality of patterns of blinks, vibrations, or color are prepared and these patterns are set on a portable terminal device of the calling party, the called party can identify the calling party in the same manner as mentioned previously. Further, through use of two or more of sound patterns, blink patterns, vibration patterns, and backlight colors in combination, a much greater number of calling party can be set on the portable terminal device. Further, so long as the portable terminal device is provided with display means capable of displaying characters in addition to the incoming call reporting means, a simple message can be indicated on the portable terminal device. consequently, the called party can immediately ascertain the nature of the call without directly talking with the calling party through the portable terminal device.

According to a first aspect of the present invention, there is provided a portable terminal device which controls, on the basis of data set by a portable terminal device of a calling party, one of a sound pattern for sounding means, a vibration pattern for vibration means, and the color of backlight of display means of a portable terminal device of a called party, wherein a sound pattern set by the calling party is reported to the called party beforehand; and upon receipt of an incoming call, the called party can immediately identify the calling party.

According to a second aspect of the present invention, there is provided a portable terminal device which controls, on the basis of data set by a portable terminal device of a calling party, at least two of a sound pattern for sounding means, a vibration pattern for vibration means, and the color of backlight of display means of a portable terminal device of a called party in combination, wherein a sound pattern set by the calling party is reported to the called party beforehand; and upon receipt of an incoming call, the called party can immediately identify the calling party.

According to a third aspect of the present invention, there is provided a portable terminal device comprising receiving means for receiving a signal waveform transmitted from a portable terminal device of a calling party;

sounding means which has at least two sound patterns and is capable of reporting an incoming call; and control means which identifies, from the signal waveform received by the receiving means, sound data used for controlling the sounding means and which controls the sound pattern of the sounding means on the basis of the sound data that are identified, wherein a sound pattern set by the calling party is reported to the called party beforehand; and upon receipt of an incoming call, the called party can immediately identify the calling party.

According to a fourth aspect of the present invention, the portable terminal device as defined in the third aspect is further characterized in that the sound data includes a start code for a starting sound and a pattern data set used for specifying a sound pattern, and when the called party receives a signal waveform including the sound data, the sounding means is activated according to a sound pattern corresponding to the sound data set by the portable terminal device of the calling party. As a result, the sound data can be readily distinguished from the other data sets.

According to a fifth aspect of the present invention, there is provided a portable terminal device comprising:

receiving means for receiving a signal waveform transmitted from a calling party;

sounding means which has at least two sound patterns and is capable of reporting an incoming call;

light emission means which has at least two blink patterns and is capable of reporting an incoming call; and control means which distinguishes, from the signal waveform received by the receiving means, sound data used for controlling the sounding means, and blink data used for controlling the light emission means, and which controls the sounding pattern of the sounding means and the blink pattern of the light emission means on the basis of the sound data and the blink data that have been distinguished. As a result, many calling parties can be identified by combination of the sound pattern and the blink pattern.

According to a sixth aspect of the present invention, the portable terminal device as defined in the fifth aspect is further characterized in that the sound data have a common start code for starting sounding operations and a first pattern data set for specifying a sound pattern, the blink data have the common start code for starting blinking operations and a second pattern data set for specifying the blink pattern, as a result of the portable terminal device of the called party receiving the signal waveform including the sound data, the sounding means is activated according to a sound pattern corresponding to the sound data set by the calling party, and as a result of the portable terminal device of the called party receiving the signal waveform including the blink data, the light emission means is activated according to a blink pattern corresponding to the blink data set by the calling party. As a result, the sound data set and the blink data set can be readily distinguished from other data by specifying the positions of these data sets.

According to a seventh aspect of the present invention, the portable terminal device as defined in the fifth aspect is further characterized in that the sound data include a first start code for starting sounding operations and a first pattern data set for specifying a sound pattern, the blink data include a second start code for starting blinking operations and a second pattern data set for specifying a blink pattern, as a result of the portable terminal device of the called party receiving the signal waveform including the sound data, the sounding means is activated according to a sound pattern corresponding to the sound data set by the calling party, and as a result of the portable terminal device of the called party receiving the signal waveform including the blink data, the light emission means is activated according to a blink pattern corresponding to the blink data set by the calling party. As a result, the sound data set and the blink data set can be readily distinguished from other data by specifying the positions of these data sets.

According to an eighth aspect of the present invention, there is provided a portable terminal device comprising:

receiving means for receiving a signal waveform transmitted from a calling party;

sounding means which has at least two sound patterns and is capable of reporting an incoming call;

vibration means which has at least two vibration patterns and is capable of reporting an incoming call; and control means which distinguishes, from the signal waveform received by the receiving means, sound data used for controlling the sounding means and vibration data used for controlling the vibration means and which controls the sounding pattern of the sounding means and the vibration pattern of the vibration means on the basis of the sound data and the vibration data that have been distinguished. As a result, many calling parties can be identified by combination of the sound pattern and the vibration pattern.

According to a ninth aspect of the present invention, the portable terminal device as defined in the eighth aspect is further characterized in that the sound data have a common start code for starting sounding operations and a first pattern data set for specifying a sound pattern, the vibration data have the common start code for starting vibrating operations and a second pattern data set for specifying the vibration pattern, as a result of the portable terminal device of the called party receiving the signal waveform including the sound data, the sounding means is activated according to a sound pattern corresponding to the sound data set by the calling party, and as a result of the portable terminal device of the called party receiving the signal waveform including the vibration data, the vibration means is activated according to a vibration pattern corresponding to the vibration data set by the calling party. As a result, the sound data set and the vibration data set can be readily distinguished from other data by specifying the positions of these data sets.

According to a tenth aspect of the present invention, the portable terminal device as defined in the eighth aspect is further characterized in that the sound data include a first start code for starting sounding operations and a first pattern data set for specifying a sound pattern, the vibration data include a second start code for starting vibrating operations and a second pattern data set for specifying a vibration pattern, as a result of the portable terminal device of the called party receiving the signal waveform including the sound data, the sounding means is activated according to a sound pattern corresponding to the sound data set by the calling party, and as a result of the portable terminal device of the called party receiving the signal waveform including the vibration data, the vibration means is activated according to a vibration pattern corresponding to the vibration data set by the calling party. As a result, the sound data set and the vibration data set can be readily distinguished from other data by specifying the positions of these data sets.

According to an eleventh aspect of the present invention, there is provided a portable terminal device comprising:

receiving means for receiving a signal waveform transmitted from a calling party;

sounding means which has at least two sound patterns and is capable of reporting an incoming call;

display means which has at least two colors of backlight and is capable of reporting an incoming call; and control means which distinguishes, from the signal waveform received by the receiving means, sound data used for controlling the sounding means and illumination color data used for controlling the color of backlight of the display means and which controls the sounding pattern of the sounding means and the color of backlight of the display means on the basis of the sound data and the illumination color data that have been distinguished. As a result, many calling parties can be identified by combination of the sound pattern and the color of backlight.

According to a twelfth aspect of the present invention, the portable terminal device as defined in the eleventh aspect is further characterized in that the sound data have a common start code for starting sounding operations and a pattern data set for specifying a sound pattern, the illumination color data have the common start code for starting illumination operations and a color data set for specifying the color of backlight, as a result of the portable terminal device of the called party receiving the signal waveform including the sound data, the sounding means is controlled according to a sound pattern corresponding to the sound data set by the calling party, and as a result of the portable terminal device of the called party receiving the signal waveform including the illumination color data, the display means is controlled through use of a color corresponding to the color data set by the calling party. As a result, the sound data set and the illumination color data can be readily distinguished from other data by specifying the positions of these data sets.

According to a thirteenth aspect of the present invention, the portable terminal device as defined in the eleventh aspect is further characterized in that the sound data include a first start code for starting sounding operations and a pattern data set for specifying a sound pattern, the illumination color data include a second start code for starting illumination operations and color data for specifying the color of backlight, as a result of the portable terminal device of the called party receiving the signal waveform including the sound data, the sounding means is controlled according to a sound pattern corresponding to the sound data set by the calling party, and as a result of the portable terminal device of the called party receiving the signal waveform including the illumination color data, the display means is controlled through use of a color of backlight corresponding to the illumination color data set by the calling party. As a result, the sound data set and the vibration data set can be readily distinguished from other data by specifying the positions of these data sets.

According to a fourteenth aspect of the present invention, there is provided a portable terminal device comprising:

receiving means for receiving a signal waveform transmitted from a calling party;

sounding means which has at least two sound patterns and is capable of reporting an incoming call;

light emission means which has at least two blink patterns and is capable of reporting an incoming call;

vibration means which has at least two vibration patterns and is capable of reporting an incoming call;

display means which has at least two colors of backlight and is capable of reporting an incoming call; and control means which distinguishes, from the signal waveform received by the receiving means, sound data used for controlling the sounding means, blink data used for controlling the light emission means, vibration data used for controlling the vibration means, and illumination color data used for controlling the color of backlight of the display means, and which controls the sound pattern of the sound means on the basis of the thus-distinguished sound data, the blink pattern of the light emission means on the basis of the thus-distinguished blink data, the vibration pattern of the vibration means on the basis of the thus-distinguished vibration data, and the color of backlight of the display means on the basis of the illumination color data. As a result, many calling parties can be identified by combination of the sound pattern, the blink pattern, the vibration pattern, and the color of backlight.

According to a fifteenth aspect of the present invention, the portable terminal device as defined in the fourteenth aspect is further characterized in that the sound data have a common start code for starting sounding operations and a pattern data set for specifying a sound pattern, the blink data have the common start code for starting blinking operations and a second pattern data set for specifying a blink pattern;

the vibration data having the common start code for starting vibrating operations and a third pattern data set for specifying a vibration pattern;

the illumination color data have the common start code for starting illumination operations and a color data set for specifying the color of backlight, as a result of the portable terminal device of the called party receiving the signal waveform including the sound data, the sounding means is controlled according to a sound pattern corresponding to the sound data set by the calling party, as a result of the portable terminal device of the called party receiving the signal waveform including the blink data, the light emission means is activated according to a blink pattern corresponding to the blink data set by the calling party, as a result of the portable terminal device of the called party receiving the signal waveform including the vibration data, the vibration means is activated according to a vibration pattern corresponding to the vibration data set by the calling party, and as a result of the portable terminal device of the called party receiving the signal waveform including the illumination color data, the display means is controlled through use of a color corresponding to the color data set by the calling party. As a result, the sound data set, the blink data, the vibration data, and the illumination color data can be readily distinguished from other data by specifying the positions of these data sets.

According to a sixteenth aspect of the present invention, the portable terminal device as defined in the fourteenth aspect is further characterized in that the sound data include a first start code for starting sounding operations and a pattern data set for specifying a sound pattern, the blink data include a second start code for starting blinking operations and second pattern data for specifying a blink pattern;

the vibration data include a third start code for starting vibration operations and third pattern data for specifying a vibration pattern;

the illumination color data include a fourth start code for starting illumination operations and color data for specifying the color of backlight, as a result of the portable terminal device of the called party receiving the signal waveform including the sound data, the sounding means is controlled according to a sound pattern corresponding to the sound data set by the calling party, as a result of the portable terminal device of the called party receiving the signal waveform including the blink data, the light emission means is controlled according to a blink pattern corresponding to the blink data set by the calling party, as a result of the portable terminal device of the called party receiving the signal waveform including the vibration data, the vibration means is controlled according to a vibration pattern corresponding to the vibration data set by the calling party, as a result of the portable terminal device of the called party receiving the signal waveform including the illumination color data, the display means is controlled through use of a color of backlight corresponding to the illumination color data set by the calling party. As a result, the sound data set, the blink data, the vibration data, and the illumination color data can be readily distinguished from other data by specifying the positions of these data sets.

According to a seventeenth aspect of the present invention, the portable terminal device as defined in any of the fourth, sixth, seventh, ninth, tenth, twelfth, thirteenth, fifteenth, and sixteenth aspects is further characterized in that one or a combination of two or more of the sound data, the blink data, the vibration data, and the illumination color data is/are inserted into a specific position of transmission data or placed subsequent to a specific character, without including a start code. As a result, the sound data set, the blink data, the vibration data, and the illumination color data can be readily distinguished from other data by specifying the positions of these data sets.

According to an eighteenth aspect of the present invention, the portable terminal device as defined in any of the first, second, third, fifth, eighth, eleventh, and fourteenth aspects is characterized by further comprising display means capable of displaying characters and drawings; and control means capable of distinguishing character message data to be indicated on the display means, wherein the control means controls one or a combination of two or more of the sound pattern of the sound means, the blink pattern of the blink means, the vibration pattern of the vibration means, and the color of backlight of the display means. As a result, the called party can immediately ascertain the nature of the call by combination of the sound pattern and the character message data.

According to a nineteenth aspect of the present invention, the portable terminal device as defined in the eighteenth aspect is further characterized in that the character message data include character data and a start code for specifying a character display. As a result, the character message data can be readily distinguished from other data by specifying the position of the character message data.

According to a twentieth aspect of the present invention, the portable terminal device as defined in the eighteenth aspect is further characterized in that the character message data include character data and a start code or specifying a character display appearing after one or a combination of two or more of sound data, blink data, vibration data, and illumination color data. As a result, the character message data can be readily distinguished from other data by specifying the position of the character message data.

According to a twenty-first aspect of the present invention, the portable terminal device as defined in the eighteenth aspect is further characterized in that the character message data include character data and a start code for specifying a character display appearing before one or a combination of two or more of sound data, blink data, vibration data, and illumination color data. As a result, the character message data can be readily distinguished from other data by specifying the position of the character message data.

According to a twenty-second aspect of the present invention, the portable terminal device as defined in the eighteenth aspect is further characterized in that one or a combination of two or more of sound data, blink data, vibration data, and illumination color data is/are interposed into a specific position of the character message data or placed after a specific character, without including a start code.

According to a twenty-third aspect of the present invention, the portable terminal device as defined in the eighteenth aspect is further characterized in that, when the character message data are received, one or a combination of two or more of the sound pattern of the sound means, the blink pattern of the light emission means, the vibration pattern of the vibration means, and the color of backlight of the display means is/are controlled. As a result, the called party can identify the person the calling party without viewing the character message.

According to a twenty-fourth aspect of the present invention, the portable terminal device as defined in the eighteenth aspect is further characterized in that, when the character message data are indicated on the display means, one or a combination of two or more of the sound pattern of the sound means, the blink pattern of the light emission means, the vibration pattern of the vibration means, and the color of backlight of the display means is/are controlled. As a result, the called party can identify the calling party and can ascertain the nature of the call.

BRIEF DESCRIPTION OF THE DRAWINGS

FIG. 2 is a table showing the relationship between the number of a sound pattern and a sound pattern/melody according to a first embodiment of the present invention;

FIG. 5 is a schematic representation showing an example of a message appearing on a display as a result of the sounding operations being performed by the called party according to the first embodiment;

FIG. 6 is a schematic representation showing an example of a message appearing on a display as a result of the sounding operations being performed by the called party according to the first embodiment;

FIG. 7 is a flowchart showing one example of sound setting performed by a calling party according to a second embodiment;

FIG. 8 is a flowchart showing one example of sounding operations performed by a called party according to the second embodiment;

DETAILED DESCRIPTION OF THE PREFERRED EMBODIMENTS (First Embodiment)

Figure 1:
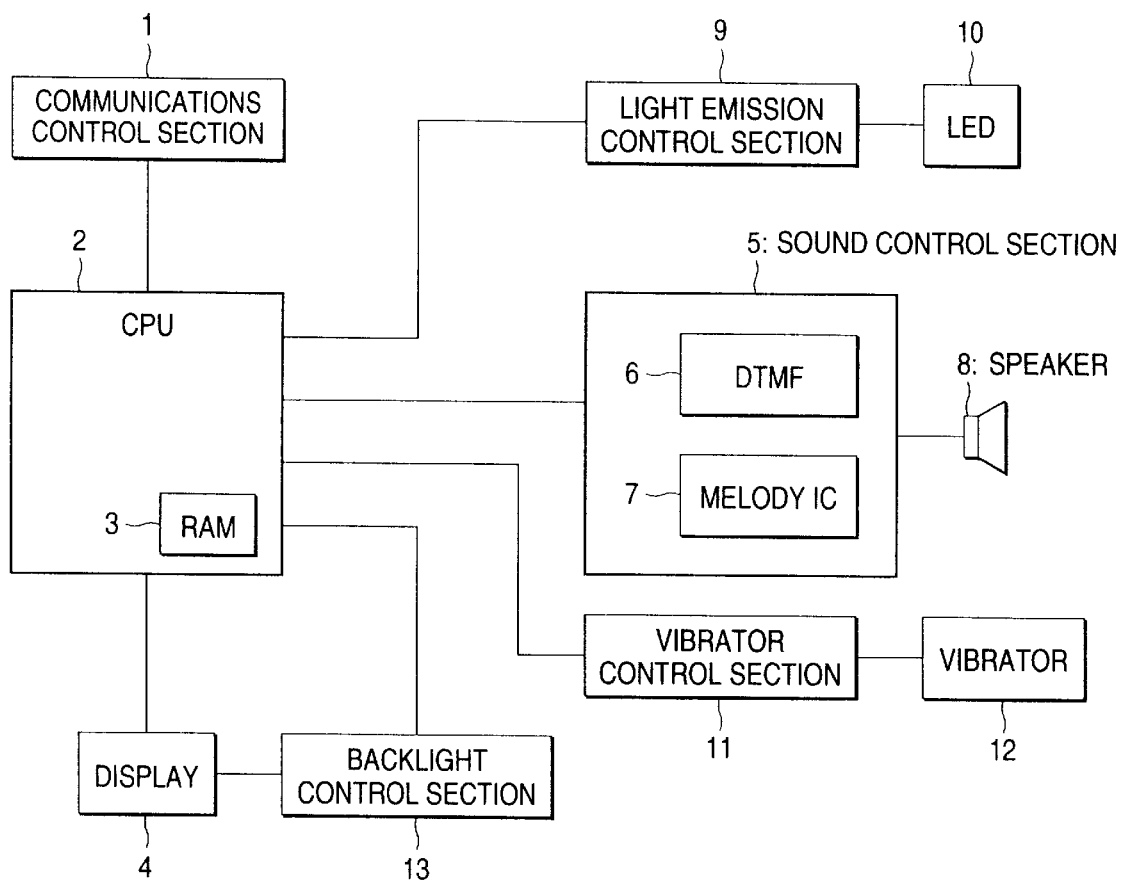
FIG. 1 is a functional block diagram schematically showing the configuration of a portable terminal device common to embodiments of the present invention.

A first embodiment of the present invention will now be described by reference to the accompanying drawings. FIG. 1 is a functional block diagram schematically showing the configuration of a portable terminal device according to the first embodiment. In FIG. 1, reference numeral 1 designates a communications control section for demodulating and decoding a signal waveform received from another portable terminal device; 2 designates a CPU which reads and controls peripheral circuits according to the thus-decoded signal; 3 designates RAM for storing a character message that is received by the portable terminal device; 4 designates a display for displaying the thus-received character message; 5 designates a sound control section for controlling sound-related operations; 6 designates a dual tone multifrequency (DTMF) circuit serving as the source of a single tone; 7 designates a melody IC serving as the source of a melody; and 8 designates a speaker for issuing the sound to the outside. Further, reference numeral 9 designates a light emission control section for controlling blink-related operations; 10 designates an LED for indicating blinks of light to the outside; 11 designates a vibration control section for controlling vibration-related operations; 12 designates a vibrator for imparting vibration to the outside; and 13 designates a backlight control section for controlling the backlight of the display 4.

With regard to an incoming call receiving action of the portable terminal device having the foregoing configuration, an explanation will be given of operations of the portable terminal device required for reporting an incoming by means of sound. On the basis of a table shown in FIG. 2, a calling party sets a sound pattern to be transmitted by his portable terminal device. In this table, sound pattern numbers "01," "02," "03," "04" are assigned single tones; i.e., the musical notes "C," the "D," the "E," and the "F," respectively. Sound pattern numbers "05" and "06" are assigned common melodies, and sound pattern numbers "07" to "18" are assigned popular melodies.

Figure 3:
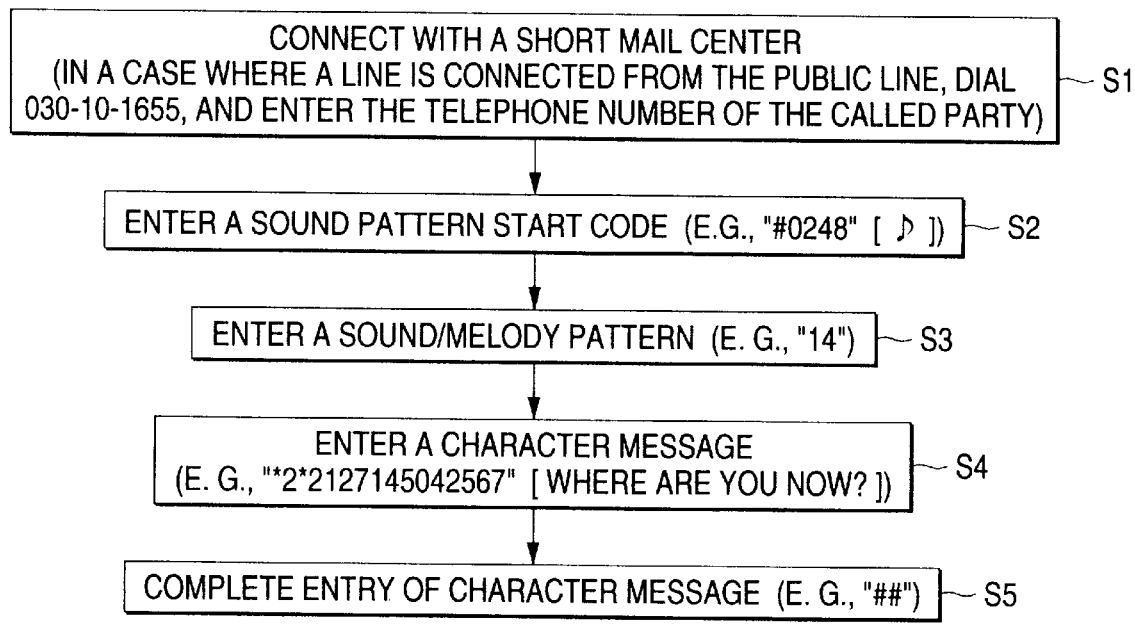
FIG. 3 is a flowchart showing one example of sound setting performed by a calling party according to the first embodiment.

The sound pattern is set according to procedures shown in FIG. 3. Provided that a communications service provider of the portable terminal device of a called party is NTT (Nippon Telegraph and Telephone Corporation) DoCoMo Ltd. and that a call is transmitted over a public line, the calling party dials telephone number 030-10-1655 first and then the telephone number of the called party, thereby establishing a line connection with a short mail center (step S1). After ascertaining an announcement for guiding the next processing step being made by way of the portable terminal device, the calling party dials code "#0248" in order to transmit a musical note "♪" representing a start code of the sound data set (step S2). In a case where the melody entitled "Let it be" shown in FIG. 2 is issued as a melody, number "14" is dialed (step S3). In a case where the user desires to send a message "Where are you now?," the calling party dials number "127145042567" subsequent to a code "*2*2" representing the start code of a free message (step S4). Finally, the calling party dials symbol "##" representing an end code of the sound data set (step S5).

Figure 4:
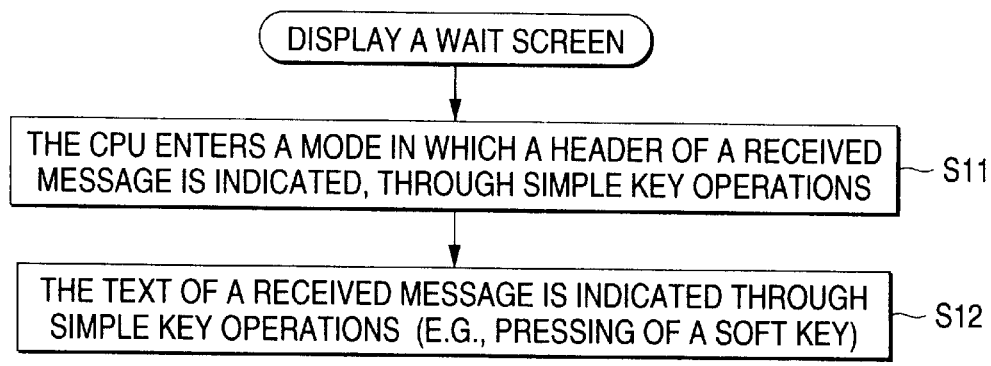
FIG. 4 is a flowchart showing one example of sounding operations performed by a called party according to the first embodiment.

In the called party's portable terminal device that has received such a transmission data set, the communications control section shown in FIG. 1 decodes the received signal, and the thus-received signal is processed by the CPU 2. The thus-processed signal is stored in the RAM 3. According to the procedures shown in FIG. 4, the called party causes the display 4 to indicate that the message is received. For example, as shown in FIG. 5, when the called party enters a menu key and a menu number, the CPU 2 enters a mode in which a header of the received character message is indicated on the display 4 (step S11). Further, from the code "#0248" included in the received data set the CPU 2 recognizes that the sound data set by the calling party are included in the received data set, thus instructing the sound control section 5 to select number "14" which represents a sound pattern corresponding to the sound data set. The sound control section 5 stores in its memory a table analogous to that shown in FIG. 2. While the header of the character message is being displayed, the called party presses a menu key in order to indicate the text of the character message (step S12). As shown in FIG. 6, the text of the character message is displayed, and through use of the melody IC 7 the sound control section 5 selects a melody corresponding to the number "14." The thus-selected melody; i.e., "Let it be," is output from the speaker 8. Although the melody is output for a predetermined period of time, the user can interrupt the melody by pressing any key.

Although in the first embodiment the timing at which sound is made according to the sound pattern is set, through a simple key operation, to the timing at which the character message is indicated on the display 4, sound may be made immediately when the portable terminal device receives an incoming call, without involving any key operations.

(Second Embodiment)

A second embodiment of the present invention will now be described. Although the second embodiment employs the portable terminal device shown in FIG. 1, which is also employed by the first embodiment, in the second embodiment the procedures according to which the calling party sets a sound pattern on his portable terminal device slightly differ from those used in the first embodiment. More specifically, as shown in FIG. 7, provided that a communications service provider of the portable terminal device of the called party is NTT (Nippon Telegraph and Telephone Corporation) DoCoMo Ltd. and that a call is transmitted over a public line, the calling party dials telephone number 030-10-1655 first and then the telephone number of the called party, thereby establishing a line connection with the short mail center (step S21), as in the case with the first embodiment. After ascertaining an announcement for guiding the next processing being made by way of the portable terminal device, the calling party dials number "*2*2127145042567" which represents "Where are you now?" (step S22). Subsequently, the calling party dials "#024" in order to transmit symbol "♪" representing the start code of the sound data set (step S23) and dials number "14" representing a melody "Let it be" (step S24). Finally, the calling party dials symbol "##" representing the end code of the sound data set.

Figures 9, 10, 11:
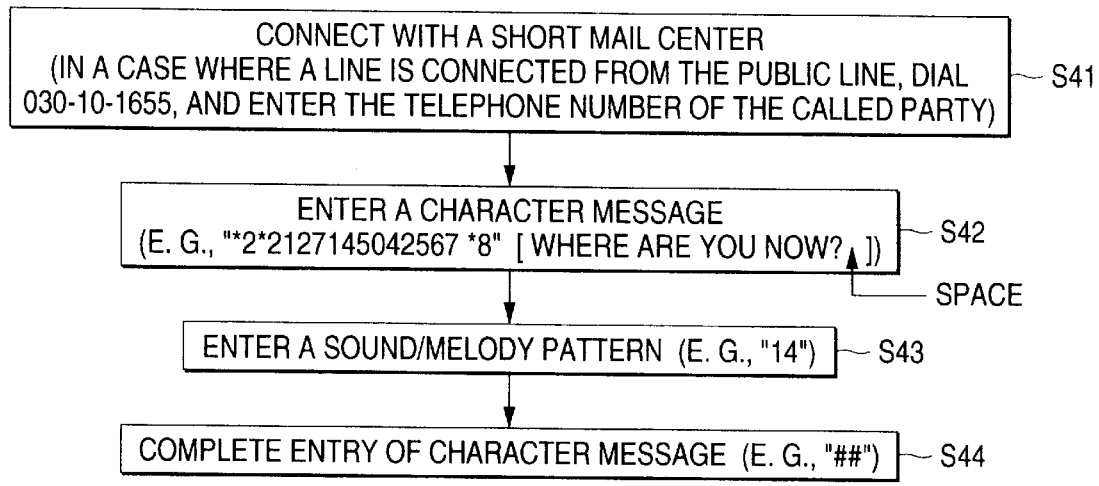
FIG. 9 is a schematic representation showing an example of a message appearing on a display as a result of the sounding operations being performed by the called party according to the second embodiment.
FIG. 10 is a schematic representation showing an example of a message appearing on a display as a result of the sounding operations being performed by the called party according to the second embodiment.
FIG. 11 is a flowchart showing one example of sounding operations performed by a called party according to a third embodiment.

In the called party's portable terminal device that has received the transmission data set, the communications control section shown in FIG. 1 decodes the received signal, and the thus-received signal is processed by the CPU 2. The thus-processed signal is stored in the RAM 3. According to the procedures shown in FIG. 8, the called party causes the display 4 to indicate that the message is received. For example, as shown in FIG. 9, when the called party enters a menu key and a menu number, the CPU 2 enters a mode in which a header of the received character message is indicated on the display 4 (step S31). Further, from the code "#0248" included in the received data set, the CPU 2 recognizes that the sound data set designated by the calling party are included in the received data set, thus instructing the sound control section 5 to select number "14" which represents a sound pattern corresponding to the sound data set. While the header of the character message is being displayed, the called party presses the menu key in order to indicate the text of the character message (step S32). As shown in FIG. 10, the text of the character message is displayed, and through use of the melody IC 7 the sound control section 5 selects a melody corresponding to the number "14." The thus-selected melody; i.e., "Let it be," is output from the speaker 8. Although the melody is output for a predetermined period of time, the user can interrupt the melody by pressing any key.

Although in the second embodiment the timing at which sound is made according to the sound pattern is set, through a simple key operation, to the timing at which the character message is indicated on the display 4, sound may be made immediately when the portable terminal device receives an incoming call, without involving any key operations.

(Third Embodiment)

A third embodiment of the present invention will now be described. Although the third embodiment employs the portable terminal device shown in FIG. 1, which is also employed by the second embodiment, the procedures according to which the calling party sets a sound pattern on his portable terminal device slightly differ from those used in the second embodiment. More specifically, as shown in FIG. 11, provided that a communications service provider of the portable terminal device of the called party is NTT (Nippon Telegraph and Telephone Corporation) DoCoMo Ltd. and that a call is transmitted over a public line, the calling party dials telephone number 030-10-1655 first and then the telephone number of the called party, thereby establishing a line connection with the short mail center (step S41), as in the case with the second embodiment. After ascertaining an announcement for guiding the next processing being made by way of the portable terminal device, the calling party dials number "*2*2127145042567" representing "Where are you now?" and "*8" representing a space, without a pause therebetween (step S42). Since dialing of "*8" results in cancellation of a free message, the calling party dials number "14" representing the melody of "Let it be" (step S43). Finally, the calling party dials symbol "##" representing the end code of the sound data set (step S44).

Figure 12:
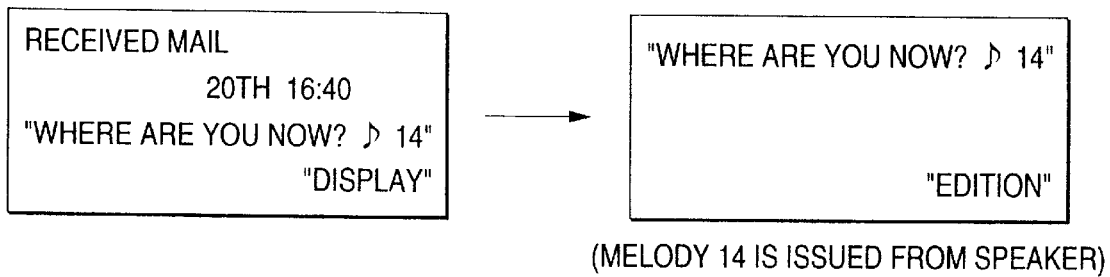
FIG. 12 is a schematic representation showing an example of a message appearing on a display as a result of the sounding operations being performed by the called party according to the third embodiment.
Figure 13:
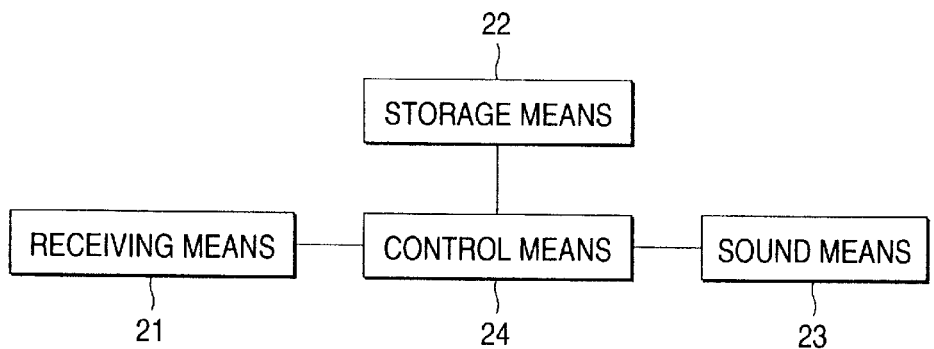
FIG. 13 is a block diagram schematically showing the configuration of an incoming call sounding section of a conventional portable terminal device.

In the called party's portable terminal device that has received the transmission data set, the portable terminal device performs the same operations as performed in the second embodiment. As shown in FIG. 12, the header of the received character message is indicated on the display 4. Subsequently, the text of the character message is indicated, and through use of the melody IC 7 the sound control section 5 selects a melody corresponding to the number "14." The thus-selected melody; i.e., "Let it be," is output from the speaker 8. Although the melody is output for a predetermined period of time, the user can interrupt the melody by pressing any key.

Although in the third embodiment the timing at which sound is made according to the sound pattern is set to the timing at which the character message is indicated on the display 4 through a simple key operation, sound may be made immediately when the portable terminal device receives an incoming call, without involving any key operations.

According to the third embodiment, the free message may be cancelled through use of "*4" representing "[," "*6" representing "]," or other specific characters.

A repetitive message can be transmitted through use of "*05" or "*044" in place of "*2*2" representing the start of the free message. Since a two-digit code necessarily follows such a code, if number "14" representing "Let it be" is input so as to follow, e.g., "*4*4OO," the start of the sound data may be specified without entry of the start code of the sound data set.

(Other Embodiments)

There are many possible variations on the embodiment of the present invention. The portable terminal device shown in FIG. 1 informs the user of an incoming call by issuing sound from the speaker 8. Alternatively, the terminal device enables the user to be informed by use of one or combined use of two or more of blink patterns of the LED 10, vibration patterns of the vibrator 12, and a change in the color of backlight of the display 4. For example, reporting of an incoming call by means of a vibrator is effective during a meeting. If the measures for reporting an incoming call are used in combination, incoming calls can be classified hierarchically. For instance, sound A can be used for reporting an incoming call from a company-related calling party; sound B can be used for reporting an incoming call from a friend of the called party; a combination of sound A and blink pattern A can be used for reporting an incoming call from company A; and a combination of sound A and blink pattern B can be used for reporting an incoming call from company B. Similarly, a combination of sound B and blink A can be used for reporting an incoming call from Mr. A; and a combination of sound B and blink B can be used for reporting an incoming call from Mr. B. In this way, sound, blink patterns, vibration patterns, and the color of backlight can be set in several ways. As a result, as compared with a single incoming call reporting method, the present invention enables specification of a larger number of calling parties.

In a case where an incoming call is reported by blinking the LED 10, the light emission control section 9 is provided with a table. In the table, two or more blink patterns for the purpose of blinking the LED 10 are each assigned a number. In the calling party's portable terminal device, after entry of a specific code for starting the processing of the blink pattern, the number of the blink pattern is input. As a result, the called party's portable terminal device causes the LED 10 to blink according to the blink pattern. The blink pattern may be provided with variations by changing of a time interval between blinks or the intensity of a blink. For example, there is provided a set of three blinks, and the blinks may be changed in such a way that the first blink assumes high intensity and the second and third blinks assume low intensity.

Similarly, the vibrator control section 11 is provided with a table. In the table, two or more vibration patterns for the purpose of causing the vibrator 12 to vibrate are each assigned a number. In the calling party's portable terminal device, after entry of a specific code for starting the processing of the vibration pattern, the number of the vibration pattern is input. As a result, the called party's portable terminal device causes the vibrator 12 to vibrate on the basis of the vibration pattern. The vibration pattern may be provided with variations by causing the vibrator to vibrate intermittently so as to change a time interval between vibrations or by changing the intensity of vibration. For example, there is provided a set of three vibrations, and the vibrations may be changed in such a way that the first vibration is strong and the second and third vibrations are weak.

Further, the backlight control section 13 is provided with a table. In the table, two or more color data sets for the purpose of changing the color of backlight of the display 4 are each assigned a number. In the calling party's portable terminal device, after entry of a specific code for starting the color of the display, the number of the color data set is input. As a result, the called party's portable terminal device changes the color of backlight of the display 4 on the basis of the color data set. The color of backlight of the display 4 may be changed by switching between a plurality of lamps of different colors, by mixture of the lamps, or by changing of the display positions of the lamps.

An incoming call may be reported by combination of the aforementioned elements; i.e., blink patterns, vibration patterns, and the color of backlight, in various manners. In principle, sound is used for reporting an incoming call. However, if sound will cause inconvenience to another person, another combination of these elements may be effective. To realize the other combination, in the portable terminal device of the calling party, entry of a specific common code for starting the combination will be followed by entry of the number of each of the patterns. Alternatively, a pair comprising a unique specific code and the number of a pattern may be input separately.

In the case of a portable terminal device not having a display for indicting a character message, only sound from a speaker, blinks of the LED, and vibration of the vibrator are available.

As mentioned above, in a portable terminal device according to the present invention, a portable terminal device of a calling party sets a sound pattern used for reporting an incoming call, and a called party is informed of the thus-set sound pattern beforehand. When sound is issued according to this sound pattern, the called party can immediately identify the calling party. Further, an incoming call may be reported by utilization of blinks of light, the vibration of a vibrator, and backlight of a display, in addition to sound. So long as a plurality of patterns for these elements are prepared and the calling party sets the patterns, the called party can immediately identify the calling party, in the same manner as mentioned previously. By combination of two or more of sound, blink patterns, vibration patterns, and backlight, various patterns become available, which in turn enables the called party to identify many more calling parties. Further, if the portable terminal device is provided with display means capable of indicating characters in addition to the incoming call reporting means, a message to be used for reporting the nature of the call can be displayed. As a result, the called party can immediately ascertain the nature of the call without talking by way of the portable terminal device.

What is claimed is:

1. A portable terminal device comprising:

receiving means for receiving a signal waveform transmitted from a portable terminal device of a calling party, wherein said signal waveform contains received sound data;

sounding means which has at least two sound patterns and is capable of reporting an incoming call; and notification control means for extracting said received sound data from said signal waveform, said notification control means also using said received sound data for controlling said sounding means and which controls the sound pattern of said sounding means according to said received sound data.

2. The portable terminal device of claim 1, wherein said received sound data includes a start code for a starting sound and pattern data used for specifying a sound pattern; and further wherein, when the called party receives said signal waveform including said received sound data, said sounding means is activated according to said pattern data corresponding to said received sound data.

3. A portable terminal device comprising:

receiving means for receiving a signal waveform transmitted from a calling party, wherein said signal waveform contains received sound data and received blink data;

sounding means which has at least two sound patterns and is capable of reporting an incoming call;

light emission means which has at least two blink patterns and is capable of reporting an incoming call; and notification control means for extracting said received sound data and said received blink data from said signal waveform, said notification control means using said received sound data for controlling said sounding means, and also using said received blink data for controlling said light emission means.

4. The portable terminal device of claim 3, wherein said received sound data and said received blink data have a common start code for starting sounding operations, and further wherein said received sound pattern includes a first pattern data set for specifying a sound pattern, and still further wherein said received blink data includes a second pattern data set for specifying a blink pattern, wherein, as a result of said portable terminal device of the called party receiving the signal waveform including the sound data, said notification control means activates said sounding means according to said sound pattern corresponding to said first pattern data; and further wherein said notification control means activates said light emission means according to said blink pattern corresponding to said second pattern data.

5. The portable terminal device of claim 3, wherein said received sound data includes a first start code for starting sounding operations and a first pattern data set for specifying a sound pattern; and further wherein said received blink data includes a second start code for starting blinking operations and a second pattern data set for specifying a blink pattern; and still further wherein, as a result of said portable terminal device of said called party receiving said signal waveform from the calling party, said sounding means is activated according to said first start code using said first pattern data for said sound pattern; and said light emission means is activated according to said second start code using said second pattern data for said blink pattern.

6. A portable terminal device comprising:

receiving means for receiving a signal waveform transmitted from a calling party; wherein said signal waveform contains received sound data, and received vibration data;

sounding means which has at least two sound patterns and is capable of reporting an incoming call;

vibration means which has at least two vibration patterns and is capable of reporting an incoming call; and notification control means for extracting said received sound data and said received vibration data from said signal waveform, said notification control means using said received sound data for controlling said sounding means and also using said received vibration data for controlling said vibration means and further wherein said control means controls the sounding pattern of said sounding means according to said received sound data and also controls the vibration pattern of said vibration means according to said received vibration data.

7. The portable terminal device of claim 6, wherein said received sound data includes a common start code for starting sounding operations and a first pattern data for specifying a sound pattern; and further wherein said received vibration data includes the common start code for starting vibrating operations and a second pattern data for specifying the vibration pattern; and wherein said sounding means is activated according to said first pattern data corresponding to said received sound data and further wherein said vibration means is activated according to said second pattern data corresponding to said received vibration data.

8. The portable terminal device of claim 6, wherein said received sound data includes a first start code for starting sounding operations and a first pattern data set for specifying a sound pattern; and further wherein said received vibration data includes a second start code for starting vibrating operations and a second pattern data set for specifying a vibration pattern; and still further wherein, as a result of said portable terminal device of the called party receiving the signal waveform transmitted by the calling party, said sounding means is activated according to said first start code using said first pattern data corresponding to said received sound data for annunciating a sound pattern and further wherein said vibration means is activated according to said second start code using said second pattern data corresponding to said received vibration data for generating a vibration pattern.

9. A portable terminal device comprising:

receiving means for receiving a signal waveform transmitted from a calling party, wherein said signal waveform includes received sound data and received illumination color data;

sounding means which has at least two sound patterns and is capable of reporting an incoming call;

display means which has at least two colors of backlight and is capable of reporting an incoming call; and notification control means for extracting said received sound data and said received illumination color data from said signal waveform, said notification control means also using said received sound data for controlling said sounding means and also using said received illumination color data for controlling the color of backlight of said display means.

10. The portable terminal device of claim 9, wherein said received sound data includes a common start code for starting sounding operations and pattern data for specifying a sound pattern; and further wherein said received illumination color data includes said common start code for starting illumination operations and color data for specifying the color of said backlight; wherein, when said portable terminal device of the called party receives said signal waveform including said sound data;

said sounding means annunciates a sound pattern according to said pattern data; and said display means displays a color according to said color data included in said received sound data.

11. The portable terminal device of claim 9, wherein said received sound data includes a first start code for starting sounding operations and pattern data for specifying a sound pattern; and further wherein said received illumination color data includes a second start code for starting illumination operations and color data for specifying the color of the backlight; and still further wherein, as a result of said portable terminal device of the called party receiving said signal waveform, said sounding means is activated according to said first start code and annunciates a sound pattern according to said pattern data, and said display means is activated according to said second start code and displays a backlight color corresponding to said color data.

12. A portable terminal device comprising:

receiving means for receiving a signal waveform transmitted from a calling party, said signal waveform including received sound data, received blink data, received vibration data, and received illumination color data;

sounding means which has at least two sound patterns and is capable of reporting an incoming call;

light emission means which has at least two blink patterns and is capable of reporting an incoming call;

vibration means which has at least two vibration patterns and is capable of reporting an incoming call;

display means which has at least two colors of backlight and is capable of reporting an incoming call; and notification control means which extracts said received sound data, said received blink data, said received vibration data, and said received illumination color data; from said signal waveform, said notification control means further controlling the sound pattern of said sound means according to said received sound data;

the blink pattern of said light emission means according to said received blink data;

the vibration pattern of said vibration means according to said received vibration data; and the color of the backlight of said display means according to said received illumination color data.

13. The portable terminal device of claim 12, wherein said received sound data includes a common start code for starting sounding operations and first pattern data for specifying a sound pattern; said received blink data includes said common start code for starting blinking operations and second pattern data for specifying a blink pattern; said received vibration data includes said common start code for starting vibrating operations and third pattern data for specifying a vibration pattern; said received illumination color data includes said common start code for starting illumination operations and color data for specifying the color of said backlight; and further wherein said sounding means is activated according to said first pattern data, said light emission means is activated according to said second pattern data, said vibration means is activated according to said third pattern data; and said display means is activated according to said color data.

14. The portable terminal device of claim 12, wherein said received sound data includes a first start code for starting sounding operations and first pattern data for specifying a sound pattern;

said received blink data includes a second start code for starting blinking operations and second pattern data for specifying a blink pattern;

said received vibration data includes a third start code for starting vibration operations and third pattern data for specifying a vibration pattern;

said received illumination color data includes a fourth start code for starting illumination operations and color data for specifying the color of backlight; wherein, as a result of said portable terminal device of the called party receiving said signal waveform, said sounding means is controlled according to a sound pattern corresponding to said received sound data;

said light emission means is controlled according to a blink pattern corresponding to said received blink data;

said vibration means is controlled according to a vibration pattern corresponding to said received vibration data; and said display means is controlled through use of a color of backlight corresponding to said received illumination color data.

15. The portable terminal device of claim 1, wherein said signal waveform includes transmission data including said sound data;

and further wherein said received sound data is inserted into a specific position of said transmission data or placed subsequent to a specific character; and still further wherein, when the called party receives said signal waveform including said transmission data, said sounding means is activated according to said received sound data.

16. The portable terminal device of claim 3, wherein said signal waveform includes transmission data including said received sound data and received blink data; and further wherein one or both of said received sound pattern and said received blink data, is inserted into a specific position in said transmission data or placed subsequent to a specific character; and still further wherein said notification control means activates said sounding means according to said received sound pattern; and said notification control means activates said light emission means according to said received blink data.

17. The portable terminal device of claim 6, wherein said signal waveform comprises transmission data including said received sound data and said received vibration data, and further wherein one or both of said received sound data and, said received vibration data is inserted into a specific position in said transmission data or placed subsequent to a specific character, and still further wherein said sounding means is activated according to said sound data; and said vibration means is activated according to said vibration data.

18. The portable terminal device of claim 9, wherein said signal waveform comprises transmission data including received sound data and received illumination color data;

and wherein one or both of said received sound data, and said received illumination color data, is inserted into a specific position in said transmission data or placed subsequent to a specific character, and further wherein said sounding means annunciates a sound pattern according to said received sound data; and said display means displays a color according to said received illumination color data.

19. The portable terminal device of claim 13, wherein, said signal waveform comprises transmission data including;

said received sound data;

said received blink data;

said received vibration data; and said received illumination color data; and wherein one or more of the members of the group consisting of said received sound data, said received blink data, said received vibration data, and said received illumination color data, is inserted into a specific position in said transmission data or placed subsequent to a specific character; and further wherein said sounding means is activated according to said received sound data, said light emission means is activated according to said received blink data, said vibration means is activated according to said received vibration data; and said display means is activated according to said received color illumination data.

20. The portable terminal device of claim 3, further comprising:

display means capable of displaying characters and drawings; and notification control means capable of distinguishing character message data to be indicated on said display means; wherein said notification control means controls one or both of the sound pattern of said sound means and the blink pattern of said blink means.

21. The portable terminal device of claim 6, further comprising:

display means capable of displaying characters and drawings; and notification control means capable of distinguishing character message data to be indicated on said display means; wherein said notification control means controls one or both of the sound pattern of said sound means and the vibration pattern of said vibration means.

22. The portable terminal device of claim 9, further comprising:
- display means capable of displaying characters and drawings; and
- notification control means capable of distinguishing character message data to be indicated on said display means; wherein
- said notification control means controls one or both of the sound pattern of said sound means and the color of the backlight of said display means.

23. The portable terminal device of claim 12, further comprising:
- display means capable of displaying characters and drawings; and
- notification control means capable of distinguishing character message data to be indicated on said display means; wherein
- said notification control means controls one or more of the members of the group consisting of the sound pattern of said sound means, the blink pattern of said blink means, the vibration pattern of said vibration means, and the color of backlight of said display means.

24. The portable terminal device of any one of claims 20 to 23, wherein said character message data includes character data and a character start code for specifying a character display.

25. The portable terminal device according to claim 24, wherein
- said character message data appears after one or more of said received data.

26. The portable terminal device according to claim 24, wherein
- said character message data appears before one or more of said received data.

27. The portable terminal device according to claim 24, wherein
- said notification control means is activated after said character message data is received.

28. The portable terminal device according to claim 24 wherein
- said notification control means is activated when said character message data is displayed on said display means.

* * * * *

UNITED STATES PATENT AND TRADEMARK OFFICE
CERTIFICATE OF CORRECTION

PATENT NO.     : 6,411,198 B1
DATED          : June 25, 2002
INVENTOR(S)    : Koutarou Hirai et al.

It is certified that error appears in the above-identified patent and that said Letters Patent is hereby corrected as shown below:

Column 2,
Line 4, please delete "consequently", and insert therefor -- Consequently --.

Signed and Sealed this

Tenth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.   : 6,411,198 B1
DATED        : June 25, 2002
INVENTOR(S)  : Koutarou Hirai et al.

It is certified that error appears in the above-identified patent and that said Letters Patent is hereby corrected as shown below:

<u>Title page,</u>
Item [56], OTHER PUBLICATIONS, please insert -- WO 96/06417 --.

Signed and Sealed this

Fifteenth Day of April, 2003

JAMES E. ROGAN
*Director of the United States Patent and Trademark Office*